United States Patent
Liu et al.

(10) Patent No.: US 12,395,266 B2
(45) Date of Patent: Aug. 19, 2025

(54) SEQUENCE GENERATION METHOD, SIGNAL RECEIVING METHOD, APPARATUS, AND TERMINAL

(71) Applicant: VIVO MOBILE COMMUNICATION CO., LTD., Dongguan (CN)

(72) Inventors: Siqi Liu, Dongguan (CN); Kai Wu, Dongguan (CN); Zichao Ji, Dongguan (CN); Yong Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 494 days.

(21) Appl. No.: 17/355,162

(22) Filed: Jun. 22, 2021

(65) Prior Publication Data

US 2021/0320749 A1 Oct. 14, 2021

Related U.S. Application Data

(63) Continuation of application No. PCT/CN2019/105610, filed on Sep. 12, 2019.

(30) Foreign Application Priority Data

Dec. 28, 2018 (CN) .......................... 201811629704.X

(51) Int. Cl.
*H04L 1/00* (2006.01)
*H04L 5/00* (2006.01)
*H04W 4/40* (2018.01)

(52) U.S. Cl.
CPC .......... *H04L 1/0023* (2013.01); *H04L 5/0048* (2013.01); *H04L 5/0053* (2013.01); *H04W 4/40* (2018.02)

(58) Field of Classification Search
CPC ... H04L 1/0023; H04L 5/0048; H04L 5/0053; H04L 5/0007; H04L 5/0094; H04L 1/00; H04W 4/40
See application file for complete search history.

(56) References Cited

U.S. PATENT DOCUMENTS

2016/0234045 A1* 8/2016 Lindoff ............. H04L 25/03866
2016/0366717 A1* 12/2016 Yang ................. H04L 25/03866
(Continued)

FOREIGN PATENT DOCUMENTS

| CN | 101931485 A | 12/2010 |
| CN | 104683969 A | 6/2015 |

(Continued)

OTHER PUBLICATIONS

International Search Report issued in corresponding International Application No. PCT/CN2019/105610, mailed Nov. 27, 2019, 5 pages.

(Continued)

*Primary Examiner* — Yaotang Wang

(74) *Attorney, Agent, or Firm* — IPX PLLC

(57) ABSTRACT

This disclosure provides a sequence generation method, a signal receiving method, an apparatus, and a terminal, and pertains to the field of communications technologies. The sequence generation method is applied to a terminal, including: generating a scrambling code sequence or a reference signal sequence by using assistance information, where the assistance information includes at least part of at least one of the following information, or a value obtained by mapping the at least part, or a range of at least one of the following information: identifier information; timing information; payload information of a signal corresponding to the sequence; payload information of a signal associated with the sequence; a scheduling mode; or a transmission mode.

20 Claims, 3 Drawing Sheets

Generate a scrambling code sequence or a reference signal sequence by using assistance information, where the assistance information includes at least part of at least one of the following information, or a value obtained by mapping the at least part, or a range of at least one of the following information: identifier information; timing information; payload information of a signal to which the sequence belongs; payload information of a signal associated with the sequence; a scheduling mode; and a transmission mode ~101

(56) References Cited

U.S. PATENT DOCUMENTS

2018/0367271 A1    12/2018  Park et al.
2021/0037557 A1*    2/2021  Yamada ................ H04L 1/0041
2021/0135803 A1*    5/2021  Chang ............... H04W 74/0808

FOREIGN PATENT DOCUMENTS

| CN | 104853339 A | 8/2015 |
| CN | 107241123 A | 10/2017 |
| CN | 108282305 A | 7/2018 |
| CN | 108811010 A | 11/2018 |
| CN | 108988978 A | 12/2018 |
| WO | 2013117003 A1 | 8/2013 |
| WO | 2014067101 A1 | 5/2014 |

OTHER PUBLICATIONS

LG Electronics, "Feature lead summary for agenda item 7.2.4.1.1 Physical layer structure", 3GPP TSG RAN WG1 Meeting #95, R1-1813927, Nov. 16, 2018.
ITL, "Considerations on sidelink synchronization for NR V2X", 3GPP TSG RAN WG1 Meeting #95, R1-1813493, Nov. 16, 2018.
First Office Action issued in related Chinese Application No. 201811629704.X, mailed Nov. 27, 2020, 10 pages.
Third Office Action issued in related Chinese Application No. 201811629704.X, mailed Oct. 28, 2021, 13 pages.

\* cited by examiner

Generate a scrambling code sequence or a reference signal sequence by using assistance information, where the assistance information includes at least part of at least one of the following information, or a value obtained by mapping the at least part, or a range of at least one of the following information: identifier information; timing information; payload information of a signal to which the sequence belongs; payload information of a signal associated with the sequence; a scheduling mode; and a transmission mode ~101

FIG. 1

Receive a signal, where a scrambling code sequence or a reference signal sequence for the signal is generated by using assistance information, and the assistance information includes at least part of at least one of the following information, or a value obtained by mapping the at least part, or a range of at least one of the following information: identifier information; timing information; payload information of a signal to which the sequence belongs; payload information of a signal associated with the sequence; a scheduling mode; and a transmission mode ~201

FIG. 2

SEQUENCE GENERATION METHOD, SIGNAL RECEIVING METHOD, APPARATUS, AND TERMINAL

CROSS-REFERENCE TO RELATED APPLICATIONS

This application is a bypass continuation of PCT Application No. PCT/CN2019/105610 filed Sep. 12, 2019, which claims priority to Chinese Patent Application No. 201811629704.X filed in China on Dec. 28, 2018, both of which are incorporated herein by reference in their entireties.

TECHNICAL FIELD

This disclosure relates to the field of communications technologies, and in particular, to a sequence generation method, a signal receiving method, an apparatus, and a terminal.

BACKGROUND

In Long Term Evolution (LTE) vehicle to everything (V2X), terminals may be classified into the following groups based on whether the terminals (User Equipment, hereafter referred to as "UE") are within a coverage area of a base station:

1. Terminals inside a coverage area: A network indicates, in a System Information Block (SIB) or Radio Resource Control (RRC), a sidelink synchronization signal sequence that a terminal needs to transmit, and the terminal uses a sidelink resource indicated by the network to transmit the sidelink synchronization signal sequence, and uses a sidelink resource indicated by the network for sidelink communication.

2. Terminals outside a coverage area: A terminal selects a sidelink transmission resource from a resource pool preconfigured by a manufacturer. The terminal may select a sidelink synchronization signal sequence on its own or infer, based on its own synchronization source, a sidelink synchronization signal sequence supposed to be used, and perform sidelink communication.

Terminals may be classified into the following groups by resource selection mode of the terminals:

1. Mode3 terminals: A resource used by this type of user in sidelink communication is scheduled by a base station.

2. Mode4 terminal: This type of user selects, based on a sensing result and energy measurement, a resource used in sidelink communication.

Similarly, in New Radio (NR) V2X, terminals may also be classified into terminals within a coverage area and terminals outside a coverage area, or mode1 terminals and mode2 terminals. The mode1 terminals are similar to the mode3 terminals in LTE V2X in that sidelink transmission is scheduled by base stations, and the mode2 terminals are similar to the mode4 terminals in LTE V2X in that there is no scheduling by base stations.

In LTE, random sequence generation and scrambling are based on Physical Cell Identifiers (PCIs). Because adjacent cells have different PCIs, sequences thus generated are also different. Therefore, different random sequences in different cells can be realized, thereby randomizing inter-cell interference to improve decoding performance.

In a Synchronization Signal Block (SSB) in NR, scrambling is performed twice for a Physical Broadcast Channel (PBCH). In both the two times of scrambling, initialization is based on the PCI, and a scramble sequence of a length L is generated. In the first time of scrambling, a sequence part for scrambling is determined based on the second and third bits of a System Frame Number (SFN). For example, when the two bits are 00, the first quarter of the sequence of the length L is selected. In the second time of scrambling, a sequence part for scrambling is determined based on the least significant two or three bits of an SSB index. For example, if the sequence part for scrambling is determined based on the least significant two bits of the SSB index, when the two bits are 00, the first quarter of the sequence of the length L is selected.

The following problems are noted in related arts:

Different sidelink terminals may use a same sidelink resource to transmit sidelink synchronization signal blocks, and use a same synchronization signal sequence, but the sidelink synchronization signal blocks these terminals transmit may carry different other information in payload. For example, part of payload of Physical sidelink broadcast Control Channels (PSBCHs) transmitted by the terminals may be different. In this case, other sidelink terminals may simultaneously receive synchronization signal blocks from a plurality of transmitting terminals on a same sidelink resource, but can neither directly distinguish between the synchronization signal blocks from the different transmitting terminals by detecting synchronization signal sequences, nor determine the transmitting terminals by decoding different PSBCHs. In addition, a result of measurement on this resource is actually a superposition of the synchronization signal blocks from the plurality of transmitting terminals, and therefore is not accurate, and beam-related operations are also impossible for multi-beam scenarios.

In the foregoing scenario, if a scrambling code generation formula for an R15 NR SSB is still used for PSBCHs, exactly the same scrambling code sequence may be generated when different transmitting terminals use the same synchronization signal sequence to send S-SSBs of a same index on the same resource, and consequently, randomization of interference cannot be implemented. In this case, even if the transmitting terminals can indicate their own identities by having PSBCHs carry terminal identifiers, the receiving terminals may fail in decoding due to interference.

In LTE, scheduling control information (sidelink control information, hereafter referred to as "SCI") of different sidelink terminals is initialized in exactly the same manner, and therefore all transmitting terminals use a same scrambling code sequence. Due to high terminal density on NR sidelinks, a probability of SA resource conflicts between different transmitting terminals increases. Once SA resource conflicts occur, retaining use of the LTE SCI scrambling mode will cause serious interference.

SUMMARY

The technical problem to be resolved by this disclosure is to provide a sequence generation method, a signal receiving method, an apparatus, and a terminal, in order to allow randomization of interference between signals from different users, from a same user group, or from different user groups, and reduce a false alarm probability in channel or signal reception.

To resolve the technical problem, the following technical solutions are provided in embodiments of this disclosure.

According to a first aspect, an embodiment of this disclosure provides a sequence generation method, applied to a terminal, including:

generating a scrambling code sequence or a reference signal sequence by using assistance information, where the assistance information includes at least part of at least one of the following information, or a value obtained by mapping the at least part, or a range of at least one of the following information:

identifier information;
timing information;
payload information of a signal corresponding to the sequence;
payload information of a signal associated with the sequence;
a scheduling mode; or
a transmission mode.

According to a second aspect, an embodiment of this disclosure provides a signal receiving method, applied to a terminal, including:

receiving a signal, where a scrambling code sequence or a reference signal sequence for the signal is generated by using assistance information, and the assistance information includes at least part of at least one of the following information, or a value obtained by mapping the at least part, or a range of at least one of the following information:

identifier information;
timing information;
payload information of a signal corresponding to the sequence;
payload information of a signal associated with the sequence;
a scheduling mode; or
a transmission mode.

According to a third aspect, an embodiment of this disclosure provides a sequence generation apparatus, applied to a terminal, including:

a generation module, configured to generate a scrambling code sequence or a reference signal sequence by using assistance information, where the assistance information includes at least part of at least one of the following information, or a value obtained by mapping the at least part, or a range of at least one of the following information:

identifier information;
timing information;
payload information of a signal corresponding to the sequence;
payload information of a signal associated with the sequence;
a scheduling mode; or
a transmission mode.

According to a fourth aspect, an embodiment of this disclosure provides a signal receiving apparatus, applied to a terminal, including:

a receiving module, configured to receive a signal, where a scrambling code sequence or a reference signal sequence for the signal is generated by using assistance information, and the assistance information includes at least part of at least one of the following information, or a value obtained by mapping the at least part, or a range of at least one of the following information:

identifier information;
timing information;
payload information of a signal corresponding to the sequence;
payload information of a signal associated with the sequence;
a scheduling mode; or
a transmission mode.

According to a fifth aspect, an embodiment of this disclosure provides a terminal, including a memory, a processor, and a computer program that is stored in the memory and capable of running on the processor, where when the computer program is executed by the processor, the steps of the foregoing sequence generation method or the steps of the foregoing signal receiving method are implemented.

According to a sixth aspect, an embodiment of this disclosure provides a computer-readable storage medium, where the computer-readable storage medium stores a computer program, and when the computer program is executed by a processor, the steps of the foregoing sequence generation method or the steps of the foregoing signal receiving method are implemented.

The embodiments of this disclosure have the following beneficial effects:

In the foregoing technical solutions, the terminal generates the scrambling code sequence or the reference signal sequence by using the assistance information, allowing randomization of interference between channels or signals from different users, from a same user group, or from different user groups, and reducing a false alarm probability in channel or signal reception.

BRIEF DESCRIPTION OF DRAWINGS

FIG. 1 is a schematic flowchart of a sequence generation method according to an embodiment of this disclosure;

FIG. 2 is a schematic flowchart of a signal receiving method according to an embodiment of this disclosure;

DETAILED DESCRIPTION

Figure 3:
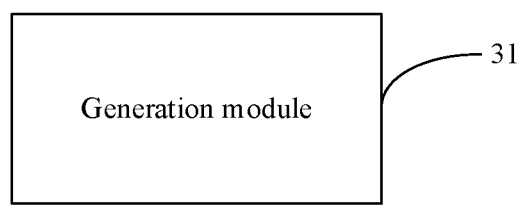
FIG. 3 is a schematic structural diagram of a sequence generation apparatus according to an embodiment of this disclosure.

To make the to-be-resolved technical problems, technical solutions, and advantages of the embodiments of this disclosure clearer, the following provides detailed descriptions with reference to the accompanying drawings and specific embodiments.

The technical solutions in the embodiments are applicable to not only sidelink communication, but also other communication systems.

A sidelink terminal may send Scheduling Assignment (SA) that is used to carry SCI for sidelink data. The SCI is transmitted on a Physical sidelink Control Channel (PSCCH). The SCI is used to schedule data on a sidelink, and the data is transmitted on a Physical sidelink Shared Channel (PSSCH). For sidelink data sent by a transmitting terminal, a receiving terminal may feed back ACK/NACK, and for a monitored sidelink channel, the receiving terminal may also feed back Channel State Information (CSI) to the transmitting terminal. This type of feedback information is sidelink feedback control information (SFCI). The SFCI is transmitted on a Physical sidelink feedback control channel (PSFCH).

In LTE V2X, a sidelink terminal broadcasts a primary sidelink synchronization signal (PSSS) and a secondary sidelink synchronization signal (SSSS) of a synchronization sequence, and a physical sidelink broadcast channel (PSBCH) on a sidelink. The PSSS and SSSS are used to help a receiving terminal obtain subframe-level timing information of the transmitting terminal. The PSSS, SSSS, and PSBCH on the sidelink may form a sidelink synchronization signal block (S-SSB) for transmission (including transmitting and receiving).

In different communication systems, names and abbreviations of signals used in this disclosure change as appropriate, and the technical solutions in this disclosure are still applicable when the abbreviations change.

The embodiments of this disclosure provide a sequence generation method, a signal receiving method, an apparatus, and a terminal, allowing randomization of interference between channels or signals from different users, from a same user group, or from different user groups, and reducing a false alarm probability in channel or signal reception. The terminal in this disclosure may be UE or a road side unit (RSU).

An embodiment of this disclosure provides a sequence generation method applied to a terminal. As shown in FIG. 1, the following step is included:

Step 101. Generate a scrambling code sequence or a reference signal sequence by using assistance information, where the assistance information includes at least part of at least one of the following information, or a value obtained by mapping the at least part, or a range of at least one of the following information:
  identifier information;
  timing information;
  payload information of a signal corresponding to the sequence;
  payload information of a signal associated with the sequence;
  a scheduling mode, including, for example, mode 1 and mode 2, where mode 2 may include at least one of mode 2a, mode 2b, mode 2c, and mode 2d; or
  a transmission mode, for example, unicast, multicast, or broadcast.

In this embodiment, the terminal generates the scrambling code sequence or the reference signal sequence by using the assistance information, allowing randomization of interference between channels or signals from different users, from a same user group, or from different user groups, and reducing a false alarm probability in channel or signal reception.

Further, the assistance information further includes at least part of at least one of the following information, or a value obtained by mapping the at least part, or a range of at least one of the following information:
  service information, for example, at least one of service status, service delay requirement, service coverage requirement, service data rate requirement, periodic service, non-periodic service, and semi-persistent service;
  a resource allocation mode, for example, at least one of resource allocation mode 0, resource allocation mode 1, and resource allocation mode 2;
  resource pool information;
  bandwidth Part (BWP) information;
  carrier information; or
  geographic location information, for example, at least one of zone information and geographic information.

The reference to information included in the assistance information may include only part or all of the information. For example, for reference to a UE identifier being included, it is possible that only a few bits of the UE identifier are included, or information that has a mapping relationship with the UE identifier is included, for example, monitoring occasion information mapped to the UE identifier, or a hash function result of the UE identifier. Similarly, for other related information such as the payload information in the assistance information, this also applies.

Further, the assistance information is obtained in the following manner:
  obtaining the assistance information that is configured by a network side; or
  obtaining the assistance information that is preconfigured; or
  obtaining the assistance information that is configured by other terminals; or
  generating the assistance information.

Configuration by the other terminals includes such indication being carried in RRC, MAC, SCI, SFCI, RS, and other information.

One part of the assistance information may be obtained in one of the foregoing manners, and another part of the assistance information may be obtained in another one of the foregoing manners.

Further, the timing information includes at least one of the following:
  a frame number on a sidelink, a subframe number on a sidelink, a slot number on a sidelink, a millisecond number on a sidelink, and an orthogonal frequency division multiplexing (OFDM) symbol number on a sidelink, where the frame number may be an SFN or a direct frame number (DFN), and the number herein may be a relative time number, for example, a slot number with respect to a resource pool, or may be an absolute time number, for example, a frame number with respect to SFN0 or the absolute zero of time.

Further, the generating a scrambling code sequence by using assistance information includes:
  determining at least one of the following based on the assistance information:
  an initialization state of the scrambling code sequence, a generation formula for the scrambling code sequence, a candidate sequence for the scrambling code sequence, a sequence part for scrambling, and a cyclic shift of the scrambling code sequence, where for example, if a value of the la bit of the assistance information is lb, the sequence is initialized and cyclically shifted by lb*L bits before being used to scramble a current signal.

Specifically, any one of the foregoing information may be determined based on at least one item of the assistance information; or a plurality of items of the foregoing information may be determined based on at least one item of the assistance information, where the plurality of items of the foregoing information may be determined based on same assistance information or may be determined separately based on different assistance information.

Further, the identifier information includes at least one of the following:
  a terminal identifier;
  an identifier of a group to which the terminal belongs;
  an identifier of a header user in a group to which the terminal belongs, where the header user may also be referred to as a scheduled user;
  an identifier of a user type;
  an identifier of a synchronization source for a user;
  an identifier of a signal sequence;
  an identifier of a signal to which the scrambling code belongs; or
  a scrambling code identifier.

In a case that the signal sequence is a synchronization signal, the identifier information of the signal sequence, that is, identifier information of the synchronization signal sequence, includes at least one of the following: a primary synchronization sequence identifier, a secondary synchronization sequence identifier, or a joint identifier of primary and secondary synchronization sequences.

Further, the identifier includes at least one of the following:

a physical layer identifier, a media access control identifier, a radio link control identifier, a Packet Data Convergence Protocol (PDCP) identifier, a Service Data Adaptation Protocol (SDAP) identifier, a radio resource control identifier, an application layer identifier, or other identifiers that can reflect characteristics of an object of interest. The identifier mentioned herein may be a global identifier or a relative identifier (for example, an intra-group identifier or an intra-region identifier). The identifier mentioned herein may be a direct identifier (for example, 1 means group 1), or an indirect identifier (for example, a sidelink synchronization signal ID being 0 in LTE indirectly indicates that a synchronization source for the user is GNSS, in which case the synchronization signal ID is a type of indirect identifier of the synchronization source). For an object of interest, there may be more than one identifier (for example, a type0 search space in NR indicates that the search space is used for SIB1 PDCCH monitoring, in which case type0 is a type of direct identifier of the search space; for example, if type0 search space ID=0, ID=0 is also a type of direct identifier of the search space). The UE mentioned herein may be target UE (which may alternatively be referred to as destination UE, or receiving UE, or scheduled UE), source UE (source UE, which may alternatively be referred to as transmitting UE, or scheduling UE), or relay UE. A group (which may alternatively be referred to as queue or platoon) to which the UE belongs may be a group to which the target UE or the source UE or the relay UE belongs, and header UE (which may be referred to as scheduling UE) in the group to which the UE belongs may be the header of the group to which the target UE or the source UE or the relay UE belongs.

Further, in a case that the signal to which the scrambling code belongs is a signal on a PSBCH, the identifier of the signal to which the scrambling code belongs is an identifier of the PSBCH, and includes at least one of the following:

an S-SSB index of a S-SSB where the PSBCH is located;
a synchronization signal sequence identifier in an S-SSB; or
an identifier carried in a PSBCH in an S-SSB.

Alternatively, in a case that the signal to which the scrambling code belongs is SCI, the identifier of the signal to which the scrambling code belongs is an identifier of the SCI, and includes at least one of the following:

a radio network temporary identifier (RNTI) corresponding to the SCI;
a format of the SCI;
a type of the SCI;
an identifier of a search space corresponding to the SCI, where the identifier of the search space may be a type or an ID of the search space;
an identifier of a process corresponding to the SCI; or
a beam information identifier of a PSCCH to which the SCI belongs.

Alternatively, in a case that the signal to which the scrambling code belongs is SFCI, the identifier of the signal to which the scrambling code belongs is an identifier of the SFCI, and includes at least one of the following:

an RNTI corresponding to the SFCI;
a format of the SFCI;
a type of the SFCI;
an identifier of a search space corresponding to the SFCI, where the identifier of the search space may be a type or an ID of the search space;
an identifier of a process corresponding to the SFCI; or
a beam information identifier of a PSFCH to which the SFCI belongs.

Alternatively, in a case that the signal to which the scrambling code belongs is SFCI, the identifier of the signal to which the scrambling code belongs is an identifier of data corresponding to the SFCI, and includes at least one of the following:

an identifier carried in the data;
an identifier of a process corresponding to the data;
cyclic redundancy check (CRC) of the data; or
a beam information identifier of the data.

Alternatively, in a case that the signal to which the scrambling code belongs is sidelink data, the identifier of the signal to which the scrambling code belongs is an identifier of SCI that schedules the sidelink data, and includes at least one of the following:

an RNTI corresponding to the SCI;
a format of the SCI;
a type of the SCI;
an identifier of a search space corresponding to the SCI, where the identifier of the search space may be a type or an ID of the search space;
an identifier of a process corresponding to the SCI;
CRC of the SCI; or
a beam information identifier of a PSCCH to which the SCI belongs.

The beam information identifier may be used for quasi co-location (QCL) reference during signal transmission, or may be used for beam identification for at least one of these purposes: link quality monitoring, beam quality monitoring, measurement, or beam direction indication.

Further, in the assistance information, information used for determining the initialization state at least partially coincides with information carried in a reference signal corresponding to the scrambling code sequence. Specifically, assistance information used for reference signal initialization may coincide with that used for scrambling code initialization, and/or information carried by the reference signal coincides with assistance information used for scrambling code initialization.

Further, the method specifically includes at least one of the following:

determining, based on a value of the at least one item of the assistance information, an initialization state corresponding to the value, where the initialization state is a formula or a binary number;
determining, based on a value of the at least one item of the assistance information, a sequence generation formula corresponding to the value;
determining, based on a value of the at least one item of the assistance information, a candidate sequence corresponding to the value;
determining, based on a value of the at least one item of the assistance information, a part for scrambling, in the sequence, corresponding to the value; or
determining, based on a value of the at least one item of the assistance information, a cyclic shift, of the sequence, corresponding to the value.

Further, the determining, based on a value of the at least one item of the assistance information, an initialization state corresponding to the value includes:

in a case that N parameters in the assistance information are used to determine the initialization state, determining the initialization state according to the following formula:

$$c_{init} = \left(\sum_{i=1}^{N} n_i \cdot 2^{coe_i}\right) \mod 2^M \text{ or } c_{init} = \sum_{i=1}^{N} n_i \cdot 2^{coe_i},$$

where $n_i$ is the $i^{th}$ parameter in the assistance information used to determine the initialization state, $2^{coe_i}$ is a coefficient of the parameter and is an integer power of 2, and M indicates that the scrambling code sequence is generated based on a sequence of a length M.

Further, in a case that the initialization state is determined based on the identifier information in the assistance information, if P parameters in the identifier information are used to determine the initialization state, the following formula holds:

$$c_{init} = \left(\sum_{j=1}^{P} p_j \cdot 2^{coe_j}\right) \mod 2^Q \text{ or } c_{init} = \sum_{j=1}^{P} p_j \cdot 2^{coe_j},$$

where $p_j$ is the $j^{th}$ parameter in the assistance identifier information used to determine the initialization state, $2^{coe_j}$ is a coefficient of the parameter and is an integer power of 2, and Q indicates that the scrambling code sequence is generated based on a sequence of a length Q.

Further, in a case that the scrambling code sequence is used to scramble a PSBCH, the determining an initialization state of the scrambling code sequence based on the assistance information includes:

determining the initialization state of the scrambling code sequence based on at least one of the identifier information and payload information of a signal to which the scrambling code sequence belongs.

Further, the determining the initialization state of the scrambling code sequence based on at least one of the identifier information and payload information of a signal to which the scrambling code sequence belongs includes at least one of the following:

determining the initialization state of the sequence generated, based on the identifier information;
determining the initialization state of the sequence generated, based on the payload information of the signal to which the scrambling code belongs; or
determining the initialization state of the sequence generated, based on the payload information of the signal to which the scrambling code belongs and a synchronization signal sequence identifier in the identifier information.

When a plurality of scrambling subsequences are included, initialization states of the plurality of scrambling subsequences may be determined separately using the foregoing plurality of manners. For example, in a case that the scrambling code sequence is generated by performing a modulo-2 operation on a product of two golden sequences, an initialization state of one of the generated golden sequences is determined based on one of the foregoing manners, for example, based on the identifier information, and an initialization state of the other one of the generated golden sequences is determined based on another of the foregoing manners, for example, based on the payload information of the signal to which the scrambling code belongs and the identifier information.

Further, in a case that the scrambling code sequence is used to scramble a PSBCH, the determining a sequence part for scrambling based on the assistance information includes:

determining the sequence part for scrambling based on at least one of the identifier information, the timing information, or payload information of a PSBCH to which the sequence belongs.

Further, in a case that the scrambling code sequence is used to scramble SCI and/or SFCI and/or a PS SCH, the determining an initialization state of the scrambling code sequence based on the assistance information includes:

determining the initialization state of the scrambling code sequence based on the identifier information.

Further, the determining the initialization state of the scrambling code sequence based on the identifier information includes at least one of the following:

determining the initialization state of the sequence generated, based on a terminal identifier;
determining the initialization state of the sequence generated, based on a scrambling code identifier;
determining the initialization state of the sequence generated, based on a terminal identifier and a scrambling code identifier; or
determining the initialization state of the sequence generated, based on a terminal identifier, an identifier of a signal to which the scrambling code belongs, and a scrambling code identifier.

When a plurality of scrambling subsequences are included, initialization states of the plurality of scrambling subsequences may be determined separately using the foregoing plurality of manners. For example, in a case that the scrambling code sequence is generated by performing a modulo-2 operation on a product of two golden sequences, an initialization state of one of the generated golden sequences is determined based on one of the foregoing manners, for example, based on the terminal identifier, and an initialization state of the other one of the generated golden sequences is determined based on another of the foregoing manners, for example, based on the terminal identifier, the identifier of the signal to which the scrambling code belongs, and the scrambling code identifier.

Further, in a case that the scrambling code sequence is used to scramble SCI and/or SFCI and/or a PSSCH, the determining a sequence part for scrambling based on the assistance information includes:

determining the sequence part for scrambling based on at least one of the transmission mode, the service information, the resource allocation mode, the scheduling mode, the resource pool information, the bandwidth part information, the carrier information, or the geographic location information.

For example, different transmission modes correspond to different parts of the sequence, and the corresponding parts are used for scrambling.

Further, the generating a reference signal sequence by using assistance information includes at least one of the following:

determining an initialization state of the reference signal sequence based on the assistance information, and generating the reference signal sequence based on the initialization state; or determining a low-PAPR sequence based on the assistance information, and generating the reference signal sequence based on the low-PAPR sequence; or determining a base sequence and/or a cyclic shift and/or a group number and/or a sequence number, where the low-PAPR sequence may be a Zadoff-Chu sequence.

In a case that a reference signal is generated based on a plurality of sub-sequences, the reference signal may be generated in the foregoing two manners. For example, in a case that the reference signal is generated by performing a modulo-2 operation on a product of a low-PAPR sequence (for example, a Zadoff-Chu sequence) and a golden sequence, an initialization state of the generated golden sequence is determined based on the assistance information, and the low-PAPR sequence is determined based on the assistance information, thus generating the reference signal. In addition, the assistance information used to determine the initialization state of the golden sequence may not be exactly the same as the assistance information used to determine the low-PAPR sequence.

In this embodiment, the reference signal may be a Demodulation Reference Signal (DMRS), a channel state information reference signal (CSI reference signal, hereafter referred to as "CSI-RS"), a Sounding reference signal (SRS), a phase noise tracking reference signal (PTRS), or a timing reference signal (TRS). In the following embodiments, the DMRS is used as an example for description. When other RSs are generated based on a same type of sequence as the DMRS, the corresponding embodiments can also apply. Descriptions regarding those reference signals are not provided one by one.

Further, the identifier information includes at least one of the following:
a terminal identifier;
an identifier of a group to which the terminal belongs;
an identifier of a header user in a group to which the terminal belongs;
an identifier of a user type;
an identifier of a synchronization source for a user; or
an identifier of a signal sequence.

Further, the identifier includes at least one of the following:
a physical layer identifier, a media access control identifier, a radio link control identifier, a packet data convergence protocol identifier, a service data adaptation protocol identifier, a radio resource control identifier, or an application layer identifier.

Further, a signal associated with the reference signal sequence includes:
a control signal demodulated using the reference signal sequence, where for example, the reference signal is a PSCCH DMRS, and the signal associated with the reference signal sequence is corresponding SCI, and for another example, the reference signal is a PSBCH DMRS, and the signal associated with the reference signal sequence is a signal on a PSBCH; or
a feedback signal demodulated using the reference signal sequence, where for example, the reference signal is a PSFCH DMRS, and the signal associated with the reference signal sequence is SCI; or
a data signal demodulated using the reference signal sequence, where for example, the reference signal is a PSSCH DMRS, and the signal associated with the reference signal sequence is a data signal on a PSSCH; or
a data signal scheduled by a control signal demodulated using the reference signal sequence, where for example, the reference signal is a PSCCH DMRS, and the signal associated with the reference signal sequence is a data signal on a PSSCH scheduled by SCI; or
a data signal corresponding to a feedback signal demodulated using the reference signal sequence, where for example, the reference signal is a PSFCH DMRS, and the signal associated with the reference signal sequence is a PSSCH corresponding to SFCI feedback; or
a signal indicating the reference signal sequence, where for example, the reference signal is a DMRS, and the signal associated with the reference signal sequence is SCI or data used to indicate (activate) the DMRS; and specifically, it is possible to only indicate a particular reference signal, or to indicate activation or deactivation of some of preconfigured reference signals.

Further, the determining an initialization state of the reference signal sequence based on the assistance information includes at least one of the following:
generating the initialization state based on payload information $Payload_{mapping}$ carried in a signal associated with the reference signal sequence; or
generating the initialization state based on the identifier information, where the identifier information includes a terminal identifier $UE_{ID}^{SL}$.

Further, the determining a low-PAPR sequence based on the assistance information, and generating the reference signal sequence based on the low-PAPR sequence includes at least one of the following:
determining a reference signal sequence identifier and/or a group sequence identifier and/or a sequence identifier (sequence number) and/or a hop identifier and/or a cyclic shift based on payload information a $Payload_{mapping}$ carried in a signal associated with the reference signal sequence, where for example, the reference signal sequence ID=$Payload_{mapping}$, or the hop ID=$Payload_{mapping}$, or the group sequence ID=$Payload_{mapping}$, the sequence ID=$Payload_{mapping}$, or the cyclic shift=$Payload_{mapping}$; or
determining a reference signal sequence identifier and/or a group sequence identifier and/or a sequence identifier (sequence number) and/or a hop identifier and/or a cyclic shift based on a UE identifier $UE_{ID}^{SL}$.

In this case, one implementation is to replace $Payload_{mapping}$ in the formula with $UE_{ID}^{SL}$ to determine, based on the payload information carried in the signal associated with the reference signal sequence, the low-PAPR sequence. Details are not further described herein.

When the low-PAPR sequence includes a plurality of subsequences, for example, when the low-PAPR sequence is generated based on two ZC sequences in series, or generated based on two interleaved ZC sequences, or generated by performing a modulo-2 operation on a product of two ZC sequences, one possible implementation is to determine an identifier and/or a group sequence identifier and/or a sequence identifier (sequence number) and/or a hop identifier and/or a cyclic shift of one of the two ZC sequences based on the payload information $Payload_{mapping}$ carried in the signal associated with the reference signal sequence, and determine an identifier and/or a group sequence identifier and/or a sequence identifier (sequence number) and/or a hop identifier and/or a cyclic shift of the other of the two ZC sequences based on the UE identifier $UE_{ID}^{SL}$.

"XX sequence being generated based on a type A sequence" mentioned in the foregoing embodiment means that generation of the XX sequence is related to the type A sequence. The XX sequence may be of type A, or may be generated by using a type A sequence and another type of sequence in combination, where the latter case is not excluded from this disclosure.

The technical solutions of this disclosure are further described below with reference to specific embodiments.

Embodiment 1

For example, the assistance information includes a transmission mode. At least two of different transmission modes including broadcast, unicast, and multicast correspond to different initialization states. More specifically, the initialization value is cinit=00 in the case of broadcast, cinit=01 in the case of unicast, and cinit=10 in the case of multicast. Alternatively, at least two of different transmission modes including broadcast, unicast, and multicast correspond to different sequence generation formulas. More specifically, sequence formula 1 is used for sequence generation in the case of broadcast, sequence formula 2 is used for sequence generation in the case of unicast, and sequence formula 3 is used for sequence generation in the case of multicast. Alternatively, at least two of different transmission modes including broadcast, unicast, and multicast correspond to different candidate sequences. More specifically, available sequences are sequences 1-4 in the case of broadcast, available sequences are sequences 5-8 in the case of unicast, and available sequences are sequences 9-12 in the case of multicast. Alternatively, at least two of different transmission modes including broadcast, unicast, and multicast correspond to different parts of a sequence. More specifically, bits 0 to M−1 of the sequence correspond to broadcast, bits M to 2M−1 of the sequence correspond to unicast, and bits 2M to 3M−1 of the sequence correspond to multicast. Alternatively, at least two of different transmission modes including broadcast, unicast, and multicast correspond to different cyclic shifts of a sequence. More specifically, a cyclic shift α of the sequence corresponds to broadcast, a cyclic shift β of the sequence corresponds to unicast, and a cyclic shift γ of the sequence corresponds to multicast.

In the above examples, at least two of different transmission modes correspond to different initialization states, different sequence generation formulas, different candidate sequences, or different parts or different cyclic shifts of a same sequence. When the scrambling code sequence is generated based on other information in the assistance information, for example, the scheduling mode, the resource pool, the identifier information, the timing information, the payload information of the signal to which the scrambling code belongs, the service information, the resource allocation mode, the bandwidth part information, the carrier information, and the geographic location information, a similar design philosophy may be used so that at least two values of the other information correspond to different initialization states, different sequence generation formulas, different candidate sequences, or different parts of a same sequence. Details are not further described herein.

When the assistance information includes a plurality of parameters related to generation of the scrambling code sequence, different parameters may each correspond to at least one of an initialization state, a sequence generation formula, a candidate sequence, or a part of a same sequence, or the plurality of parameters may jointly correspond to at least one of the four. Corresponding to different sequence generation formulas may mean corresponding to different generation formulas for different types of sequences or corresponding to different generation formulas for a same type of sequence.

Embodiment 2

For example, for determining the initialization state of the sequence generated, based on the identifier information, if a corresponding reference signal also carries identifier information, this inf_id at least partially coincides with the identifier information carried in the reference signal; and for example, is a universal set or a subset or a superset thereof, that is, in a relationship of inclusion.

For example, for an S-SSB, if an RS in the S-SSB carries UE ID information, and an initialization value Cinit of a scrambling code for a PSBCH is also determined based on UE ID information, for the scrambling code for the PSBCH, the UE ID information used to determine Cinit is a universal set of (that is, exactly the same as) or a subset of the UE ID information carried in the RS in the S-SSB.

For another example, for determining the initialization state of the sequence generated, based on payload information $Payload_{mapping}$ of a signal to which the scrambling code belongs, if a corresponding reference signal also carries payload information of a signal to which a scrambling code belongs, this $Payload_{mapping}$ at least partially coincides with the payload information of the signal to which the scrambling code belongs carried in the reference signal (for example, is a universal set or a subset or a superset thereof, that is, in a relationship of inclusion).

For example, for an S-SSB, if an RS in the S-SSB carries at least part of PSBCH payload or a value mapped to by function conversion on at least part of PSBCH payload, that is, the RS carries payload information of the S-SSB, and an initialization value Cinit of a scrambling code for a PSBCH is also determined based on PSBCH payload $Payload_{mapping}$ then for the scrambling code for the PSBCH, $Payload_{mapping}$ used to determine Cinit is a universal set or a subset of the PSBCH payload information carried in the RS in the S-SSB.

With respect to the S-SSB, similar scheme designs also apply to other signals or channels, such as PSSCH, PSCCH, and PSFCH. In this case, the reference signal is a reference signal of the PSSCH, PSCCH, or PSFCH, and the signal to which the scrambling code belongs is the PSSCH, PSCCH, or PSFCH.

Embodiment 3

If the generated scrambling code sequence is used to scramble a PSBCH, and a binary number Cinit is determined based on at least one item of the assistance information, the initialization state of the generated sequence may be determined in the following manner:

determining the initialization state of the sequence generated, based on the identifier information; and further optionally, determining the initialization state of the sequence generated, based on synchronization sequence identifier information $N_{ID}^{SL}$: $c_{init}=N_{ID}^{SL}$; or optionally, determining the initialization state of the sequence generated, based on identifier information inf_id other than the synchronization sequence identifier information: $c_{init}$=inf_id; or determining the initialization state of the sequence generated, based on payload information $Payload_{mapping}$ of a signal to which the scrambling code belongs: $c_{init}$=$Payload_{mapping}$; or determining the initialization state of the sequence generated, based on identifier information inf_id other than synchronization sequence identifier information and the synchronization signal sequence identifier information $N_{ID}^{SL}$: $c_{init}=(N_{ID}^{SL} \cdot X)+\text{inf\_id}$, where X is an integer, for example, 2 to the power of xn, and one possibility is $xn = \lceil \log_2 (\max(\text{inf\_id})) \rceil$, which means that xn is the number of bits required to convert a maximum value of inf_id into a binary value; or determining the initialization state of the sequence generated, based on identifier information inf_id other than synchronization sequence identifier information and the synchronization signal sequence identifier information $N_{ID}^{SL}$: $c_{init}=(\text{inf\_id} \cdot Y) \cdot N_{ID}^{SL}$, where Y is an integer, for example, 2 to the power of an integer; or determining the initialization state of the sequence generated, based on payload information $\text{Payload}_{mapping}$ of a signal to which the scrambling code belongs and synchronization signal sequence identifier related information $N_{ID}^{SL}$: $c_{init}=(N_{ID}^{SL} \cdot Z)+\text{Payload}_{mapping}$, where Z is an integer, for example, 2 to the power of xm, and $xm = \lceil \log_2 (\max(\text{Payload}_{mapping})) \rceil$, which means that xm is the number of bits required to convert a maximum value of $\text{Payload}_{mapping}$ into a binary value; or determining the initialization state of the sequence generated, based on payload information $\text{Payload}_{mapping}$ of a signal to which the scrambling code belongs and synchronization signal sequence identifier related information $N_{ID}^{SL}$: $c_{init}=(\text{Payload}_{mapping} \cdot Y)+N_{ID}^{SL}$, where Y is an integer, for example, 2 to the power of an integer.

Embodiment 4

If the generated scrambling code sequence is used to scramble a PSBCH, determining the sequence part for scrambling based on at least one item of the assistance information may be implemented in the following manner:
determining the sequence part for scrambling based on at least one of the identifier information, PSBCH payload information, or timing information.

It is assumed that identifier information inf_id includes first information and second information, and in an embodiment:
the initialization state of the generated sequence is determined based on the first information, where Cinit=first information.

If scrambling is performed once, optionally, a to-be-generated sequence and its length may be determined based on the timing information, for example, the number of bits of the frame number information and/or the number of bits of the identifier information, and a scrambling code sequence for scrambling a current signal is determined based on a value of the carried frame number information and/or a value of the identifier information.

If scrambling is performed twice, in the first time of scrambling, a to-be-generated sequence and its length are determined based on the timing information, for example, the number of bits of the frame number information and/or the number of bits of the first information, and a scrambling code sequence for scrambling a current signal is determined based on the timing information and/or a value of the first information. In the second time of scrambling, a to-be-generated sequence and its length are determined based on the number of bits of the second information, and a scrambling code sequence for scrambling the current signal is determined based on a value of the carried second information.

A more specific implementation is as follows: the first information is a UE identifier $UE_{ID}^{SL}$, the second information is an S-SSB index, and the initialization state of the generated sequence is determined based on the first information: $c_{init}=UE_{ID}^{SL}$. This does not preclude the possibility of implementations in which the first information and the second information are other identifier information. For example, the first information or the second information is a synchronization source identifier or the like.

It is assumed that the initialization state of the generated sequence is determined based on the PSBCH payload information $\text{Payload}_{mapping}$: $c_{init}=\text{Payload}_{mapping}$, and that the identifier information inf_id includes third information.

If scrambling is performed once, optionally, a to-be-generated sequence and its length may be determined based on the timing information, for example, the number of bits of the frame number information and/or the number of bits of the PSBCH payload information $\text{Payload}_{mapping}$, and a scrambling code sequence for scrambling a current signal is determined based on a value of the carried frame number information and/or a value of the PSBCH payload information $\text{Payload}_{mapping}$.

If scrambling is performed twice, in the first time of scrambling, a to-be-generated sequence and its length are determined based on the timing information, for example, the number of bits of the frame number information and/or the number of bits of $\text{Payload}_{mapping}$ and a scrambling code sequence for scrambling a current signal is determined based on the timing information and/or a value of $\text{Payload}_{mapping}$. In the second time of scrambling, a to-be-generated sequence and its length are determined based on the number of bits of the third information, and a scrambling code sequence for scrambling the current signal is determined based on a value of the carried third information.

A more specific implementation is as follows: the third information is an S-SSB index. This does not preclude the possibility of implementations in which the third information is other identifier information.

Embodiment 5

If the generated scrambling code sequence is used to scramble SCI (or if the scrambling code is used to scramble sidelink feedback information SFCI, or if the scrambling code is used to scramble sidelink data information PSSCH), determining a binary number Cinit based on at least one item of the assistance information and initializing the sequence using Cinit may be implemented in the following manner:
determining the initialization state of the sequence generated, based on the identifier information inf_id where a more specific implementation may include:
determining the initialization state of the sequence generated, based on a synchronization sequence ID $N_{ID}^{SL}$: $c_{init}=N_{ID}^{SL}$; or
determining the initialization state of the sequence generated, based on UE identifier information $UE_{ID}^{SL}$: $c_{init}=UE_{ID}^{SL}$; or
determining the initialization state of the sequence generated, based on a scrambling code identifier $n_{ID}$: $c_{init}=n_{ID}$; or
determining the initialization state of the sequence generated, based on UE identifier information $UE_{ID}^{SL}$ and a scrambling code identifier $n_{ID}$, where a possible manner may include:

$c_{init} = (n_{ID} \cdot 2^a + UE_{ID}^{SL}) \bmod 2^M$; or $c_{init} = (UE_{ID}^{SL} \cdot 2^c + n_{ID}) \bmod 2^M$; or $c_{init} = n_{ID} \cdot 2^a + UE_{ID}^{SL}$; or $c_{init} = UE_{ID}^{SL} \cdot 2^c + n_{ID}$; or $c_{init} = n_{ID} \cdot 2^{c-1} + UE_{ID}^{SL}$; or $c_{init} = UE_{ID}^{SL} \cdot 2^{a-1} + n_{ID}$, where a is the number of bits of $UE_{ID}^{SL}$ and c is the number of bits of $n_{ID}$; or determining the initialization state of the sequence generated, based on UE identifier information $UE_{ID}^{SL}$, an identifier of a signal to which the scrambling code belongs $n_{RNTI}$, and a scrambling code identifier $n_{ID}$, where the following formula holds: $c_{init} = (n_p \cdot 2^e + n_{2q} \cdot 2^f + n_t \cdot 2^g) \bmod 2^M$ or $c_{init} = n_p \cdot 2^e + n_q \cdot 2^f + n_t \cdot 2^g$; and specifically, $c_{init} = (n_p \cdot 2^{1-t+1-q} + n_q \cdot 2^{1-t} + n_t) \bmod 2^M$ or $c_{init} = n_p \cdot 2^{1-t+1-q} + n_q \cdot 2^{1-t} + n_t$ or $c_{init} = n_p \cdot 2^{1-p-1} + n_q \cdot 2^{1-t} + n_t$ or $c_{init} = n_p \cdot 2^{1-p-1} + n_q \cdot 2^{1-q-1} + n_t$ or $c_{init} = n_p \cdot 2^{1-t+1-q} + n_q \cdot 2^{1-q-1} + n_t$, where $n_p$, $n_q$, and $n_t$ each correspond to one of the UE identifier information $UE_{ID}^{SL}$, the identifier of the signal to which the scrambling code belongs $n_{RNTI}$, and the scrambling code identifier $n_{ID}$, and $n_p$, $n_q$, and $n_t$ correspond to different types of information, for example, respectively corresponding to the UE identifier information $UE_{ID}^{SL}$, the identifier of the signal to which the scrambling code belongs $n_{RNTI}$, and the scrambling code identifier $n_{ID}$, and 1_p, 1_q, and 1_t are the numbers of bits of $n_p$, $n_q$, and $n_t$, respectively.

In the foregoing embodiment, the UE identifier information $UE_{ID}^{SL}$, the identifier of the signal to which the scrambling code belongs, $n_{RNTI}$, and the scrambling code identifier $n_{ID}$ are used as an example, which does not preclude the implementation of determining, based on the identifier information, the initialization state of the sequence generated. For example, the initialization state of the generated sequence is determined based on an identifier of a group to which UE belongs. A more specific implementation may be replacing $UE_{ID}^{SL}$ in the foregoing formula and the corresponding number of bits with the identifier of a group to which UE belongs and the number of bits of the identifier. Details are not further described herein.

Different signals may have different scrambling formulas.

Embodiment 6

If the generated scrambling code sequence is used to scramble SCI (or if the scrambling code is used to scramble sidelink feedback information SFCI, or if the scrambling code is used to scramble sidelink data information PSSCH), determining a to-be scrambled sequence based on at least one item of the assistance information may be implemented in the following manner:

determining the to-be scrambled sequence based on at least one of the transmission mode information, the service information, the resource allocation mode information, the scheduling mode information, the resource pool information, the BWP information, the carrier information, or the zone information; and determining a to-be-generated sequence and its length based on the number of bits of fourth information, and determining a scrambling code sequence for scrambling a current signal based on a value of the carried fourth information. The fourth information may be at least one of the transmission mode information, the service information, the resource allocation mode information, the scheduling mode information, the resource pool information, the BWP information, the carrier information, or the zone information. For example, when the fourth information is the transmission mode information, a value of 00 indicates that a current mode is mode 1, and in this case, the first quarter of the sequence is used for scrambling. A similar logic design may be used for an implementation in which the fourth information is another type of information. Details are not further described herein.

Embodiment 7

Generation is based on payload information $Payload_{mapping}$ carried in a signal associated with the reference signal sequence. It is assumed that the reference signal sequence is generated based on a golden sequence of a length $L_g$, and a possible implementation of initializing a pseudo-random sequence may be any one of the following:

$c_{init} = (2^r(N_{symb}^{slot} n_{s,f}^{\mu} + l + 1)(2 Payload_{mapping} + 1) + 2 Payload_{mapping}) \bmod 2^{L_g}$, where r is an integer, l is a time domain number, for example, a symbol number, $N_{symb}^{slot}$ is the number of symbols in a slot, and $n_{s,f}^{\mu}$ is a time domain number, for example, a slot number in a frame; or $c_{init} = (2^s(N_{symb}^{slot} n_{s,f}^{\mu} + l + 1)(2^t Payload_{mapping} + 1) + 2^t Payload_{mapping} + n_{SCID}) \bmod 2^{L_g}$, where s is an integer, t is an integer, for example the number of bits required by $n_{SCID}$, $n_{SCID}$ is an integer, l is a time domain number, for example, a symbol number, $N_{symb}^{slot}$ is the number of symbols in a slot, and $n_{s,f}^{\mu}$ is a time domain number, for example, a slot number in a frame; or $c_{init} = 2^u (i+1)(Payload_{mapping}+1) + 2^v(i+1) + Payload_{mapping}$, where u and v are integers.

Another possible implementation is that generation is based on UE identifier information $UE_{ID}^{SL}$. For example, $Payload_{mapping}$ in the foregoing formula is replaced with $UE_{ID}^{SL}$. Details are not further described herein.

A low-PAPR sequence is determined based on payload information $Payload_{mapping}$ carried in a signal associated with the reference signal sequence. It is assumed that the reference signal sequence is generated based on a ZC sequence of a length $L_{zc}$, and a hopping pseudo-random sequence and/or a cyclically shifted pseudo-random sequence is initialized as follows:

$c_{init} = Payload_{mapping}$ or;

$c_{init} = \lfloor Payload_{mapping} / N_{gh} \rfloor$, where $N_{gh}$ is the number of groups for hopping, for example, 30; or $c_{init} = 2^w \lfloor Payload_{mapping} / N_{gh} \rfloor + (Payload_{mapping} / N_{gh})$ where $N_{gh}$ is the number of groups for hopping, for example, 30, and w is an integer and indicates the number of bits, for example 5, required by a largest number of groups for hopping.

Hopping includes at least one of group hopping and sequence hopping, and $Payload_{mapping}$ may be part or all of payload, or a value mapped to by function conversion, or an interval of the value.

Another possible implementation is that generation is based on UE identifier information $UE_{ID}^{SL}$. For example, $Payload_{mapping}$ in the foregoing formula is replaced with $UE_{ID}^{SL}$. Details are not further described herein.

An embodiment of this disclosure further provides a signal receiving method applied to a terminal. As shown in FIG. 2, the following step is included:

Step 201: Receive a signal, where a scrambling code sequence or a reference signal sequence for the signal is generated by using assistance information, and the assistance information includes at least part of at least one of the following information, or a value obtained by mapping the at least part, or a range of at least one of the following information:
identifier information;
timing information;
payload information of a signal corresponding to the sequence;
payload information of a signal associated with the sequence;
a scheduling mode; or
a transmission mode.

In this embodiment, the terminal generates the scrambling code sequence or the reference signal sequence by using the assistance information, allowing randomization of interference between channels or signals from different users, from a same user group, or from different user groups, and reducing a false alarm probability in channel or signal reception.

Further, the assistance information further includes at least part of at least one of the following information, or a value obtained by mapping the at least part, or a range of at least one of the following information:
service information;
a resource allocation mode;
resource pool information;
bandwidth part information;
carrier information; or
geographic location information, for example, zone information and geographic information.

An embodiment of this disclosure further provides a sequence generation apparatus applied to a terminal. As shown in FIG. 3, the following is included:
a generation module 31, configured to generate a scrambling code sequence or a reference signal sequence by using assistance information, where the assistance information includes at least part of at least one of the following information, or a value obtained by mapping the at least part, or a range of at least one of the following information:
identifier information;
timing information;
payload information of a signal corresponding to the sequence;
payload information of a signal associated with the sequence;
a scheduling mode; or
a transmission mode.

In this embodiment, the terminal generates the scrambling code sequence or the reference signal sequence by using the assistance information, allowing randomization of interference between channels or signals from different users, from a same user group, or from different user groups, and reducing a false alarm probability in channel or signal reception.

Further, the assistance information further includes at least part of at least one of the following information, or a value obtained by mapping the at least part, or a range of at least one of the following information:
service information;
a resource allocation mode;
resource pool information;
bandwidth part information;
carrier information; or
geographic location information.

Further, the following is included:
an obtaining module, configured to obtain the assistance information in the following manner:
obtaining the assistance information that is configured by a network side; or
obtaining the assistance information that is preconfigured; or
obtaining the assistance information that is configured by other terminals; or
generating the assistance information.

Further, the timing information includes at least one of the following:
a frame number on a sidelink, a subframe number on a sidelink, a slot number on a sidelink, a millisecond number on a sidelink, or an OFDM symbol number on a sidelink.

Further, the generation module is specifically configured to determine at least one of the following based on the assistance information:
an initialization state of the scrambling code sequence, a generation formula for the scrambling code sequence, a candidate sequence for the scrambling code sequence, a sequence part for scrambling, and a cyclic shift of the scrambling code sequence.

Further, the identifier information includes at least one of the following:
a terminal identifier;
an identifier of a group to which the terminal belongs;
an identifier of a header user in a group to which the terminal belongs;
an identifier of a user type;
an identifier of a synchronization source for a user;
an identifier of a signal sequence;
an identifier of a signal to which the scrambling code belongs; or
a scrambling code identifier.

Further, the identifier includes at least one of the following:
a physical layer identifier, a media access control identifier, a radio link control identifier, a packet data convergence protocol identifier, a service data adaptation protocol identifier, a radio resource control identifier, or an application layer identifier.

Further, in a case that the signal to which the scrambling code belongs is a signal on a PSBCH, the identifier of the signal to which the scrambling code belongs is an identifier of the PSBCH, and includes at least one of the following:
an S-SSB index of a S-SSB where the PSBCH is located;
a synchronization signal sequence identifier in an S-SSB; or
an identifier carried in a PSBCH in an S-SSB.

Alternatively, in a case that the signal to which the scrambling code belongs is SCI, the identifier of the signal to which the scrambling code belongs is an identifier of the SCI, and includes at least one of the following:
a RNTI corresponding to the SCI;
a format of the SCI;
a type of the SCI;
an identifier of a search space corresponding to the SCI;

an identifier of a process corresponding to the SCI; or a beam information identifier of a PSCCH to which the SCI belongs.

Alternatively, in a case that the signal to which the scrambling code belongs is SFCI, the identifier of the signal to which the scrambling code belongs is an identifier of the SFCI, and includes at least one of the following:

an RNTI corresponding to the SFCI;

a format of the SFCI;

a type of the SFCI;

an identifier of a search space corresponding to the SFCI;

an identifier of a process corresponding to the SFCI; or a beam information identifier of a PSFCH to which the SFCI belongs.

Alternatively, in a case that the signal to which the scrambling code belongs is SFCI, the identifier of the signal to which the scrambling code belongs is an identifier of data corresponding to the SFCI, and includes at least one of the following:

an identifier carried in the data;

an identifier of a process corresponding to the data;

CRC of the data; or a beam information identifier of the data.

Alternatively, in a case that the signal to which the scrambling code belongs is sidelink data, the identifier of the signal to which the scrambling code belongs is an identifier of SCI that schedules the sidelink data, and includes at least one of the following:

an RNTI corresponding to the SCI;

a format of the SCI;

a type of the SCI;

an identifier of a search space corresponding to the SCI;

an identifier of a process corresponding to the SCI;

CRC of the SCI; or a beam information identifier of a PSCCH to which the SCI belongs.

Further, information in the assistance information used for determining the initialization state at least partially coincides with information carried in a reference signal corresponding to the scrambling code sequence.

Further, the generation module is specifically configured to perform at least one of the following:

determining, based on a value of the at least one item of the assistance information, an initialization state corresponding to the value, where the initialization state is a formula or a binary number;

determining, based on a value of the at least one item of the assistance information, a sequence generation formula corresponding to the value;

determining, based on a value of the at least one item of the assistance information, a candidate sequence corresponding to the value;

determining, based on a value of the at least one item of the assistance information, a part for scrambling, in the sequence, corresponding to the value; or determining, based on a value of the at least one item of the assistance information, a cyclic shift, of the sequence, corresponding to the value.

Further, the generation module is specifically configured to determine the initialization state according to the following formula when N parameters in the assistance information are used to determine the initialization state:

$$c_{init} = \left(\sum_{i=1}^{N} n_i \cdot 2^{coe_i}\right) \bmod 2^M \text{ or } c_{init} = \sum_{i=1}^{N} n_i \cdot 2^{coe_i},$$

where $n_i$ is the $i^{th}$ parameter in the assistance information used to determine the initialization state, $2^{coe_j}$ is a coefficient of the parameter and is an integer power of 2, and M indicates that the scrambling code sequence is generated based on a sequence of a length M.

Further, when the initialization state is determined based on the identifier information in the assistance information, the formula is satisfied if P parameters in the identifier information are used to determine the initialization state:

$$c_{init} = \left(\sum_{j=1}^{P} p_j \cdot 2^{coe_j}\right) \bmod 2^Q \text{ or } c_{init} = \sum_{j=1}^{P} p_j \cdot 2^{coe_j},$$

where $p_j$ is the $j^{th}$ parameter in the assistance identifier information used to determine the initialization state, $2^{coe_j}$ is a coefficient of the parameter and is an integer power of 2, and Q indicates that the scrambling code sequence is generated based on a sequence of a length Q.

Further, in a case that the scrambling code sequence is used to scramble a PSBCH, the generation module is specifically configured to determine the initialization state of the scrambling code sequence based on at least one of the identifier information and payload information of a signal to which the scrambling code sequence belongs.

Further, the generation module is specifically configured to perform at least one of the following:

determining the initialization state of the sequence generated, based on the identifier information;

determining the initialization state of the sequence generated, based on the payload information of the signal to which the scrambling code belongs; or determining the initialization state of the sequence generated, based on the payload information of the signal to which the scrambling code belongs and a synchronization signal sequence identifier in the identifier information.

Further, in a case that the scrambling code sequence is used to scramble a PSBCH, the generation module is specifically configured to determine the sequence part for scrambling based on at least one of the identifier information, the timing information, or payload information of a PSBCH to which the sequence belongs.

Further, in a case that the scrambling code sequence is used to scramble SCI and/or SFCI and/or a PSSCH, the generation module is specifically configured to determine the initialization state of the scrambling code sequence based on the identifier information.

Further, the generation module is specifically configured to perform at least one of the following:

determining the initialization state of the sequence generated, based on a terminal identifier;

determining the initialization state of the sequence generated, based on a scrambling code identifier;

determining the initialization state of the sequence generated, based on a terminal identifier and a scrambling code identifier; or determining the initialization state of the sequence generated, based on a terminal identifier, an identifier of a signal to which the scrambling code belongs, and a scrambling code identifier.

Further, in a case that the scrambling code sequence is used to scramble SCI and/or SFCI and/or a PSSCH, the generation module is specifically configured to determine the sequence part for scrambling based on at least one of the transmission mode, the service information, the resource allocation mode, the scheduling mode, the resource pool information, the bandwidth part information, the carrier information, and the geographic location information.

Further, the generation module is specifically configured to perform at least one of the following:
- determining an initialization state of the reference signal sequence based on the assistance information, and generating the reference signal sequence based on the initialization state; or
- determining a low-PAPR sequence based on the assistance information, and generating the reference signal sequence based on the low-PAPR sequence.

Further, the identifier information includes at least one of the following:
- a terminal identifier;
- an identifier of a group to which the terminal belongs;
- an identifier of a header user in a group to which the terminal belongs;
- an identifier of a user type;
- an identifier of a synchronization source for a user; or
- an identifier of a signal sequence.

Further, the identifier includes at least one of the following:
- a physical layer identifier, a media access control identifier, a radio link control identifier, a packet data convergence protocol identifier, a service data adaptation protocol identifier, a radio resource control identifier, or an application layer identifier.

Further, a signal associated with the reference signal sequence includes:
- a control signal demodulated using the reference signal sequence; or
- a feedback signal demodulated using the reference signal sequence; or
- a data signal demodulated using the reference signal sequence; or
- a data signal scheduled by a control signal demodulated using the reference signal sequence; or
- a data signal corresponding to a feedback signal demodulated using the reference signal sequence; or
- a signal indicating the reference signal sequence.

Further, the generation module is specifically configured to perform at least one of the following:
- generating the initialization state based on payload information carried in a signal associated with the reference signal sequence; or
- generating the initialization state based on the identifier information.

Further, the generation module is specifically configured to perform at least one of the following:
- determining a reference signal sequence identifier and/or a group sequence identifier and/or a sequence identifier (sequence number) and/or a hop identifier and/or a cyclic shift based on payload information carried in a signal associated with the reference signal sequence; or
- determining a reference signal sequence identifier and/or a group sequence identifier and/or a sequence identifier (sequence number) and/or a hop identifier and/or a cyclic shift based on a UE identifier.

Figure 4:
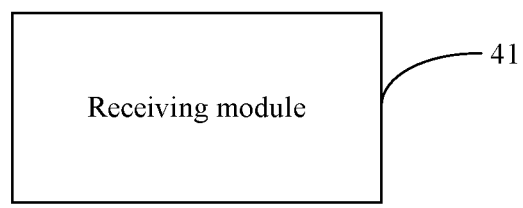
FIG. 4 is a schematic structural diagram of a signal receiving apparatus according to an embodiment of this disclosure.

An embodiment of this disclosure provides a signal receiving apparatus applied to a terminal. As shown in FIG. 4, the following is included:
- a receiving module 41, configured to receive a signal, where a scrambling code sequence or a reference signal sequence for the signal is generated by using assistance information, and the assistance information includes at least part of at least one of the following information, or a value obtained by mapping the at least part, or a range of at least one of the following information:
  - identifier information;
  - timing information;
  - payload information of a signal corresponding to the sequence;
  - payload information of a signal associated with the sequence;
  - a scheduling mode; or
  - a transmission mode.

In this embodiment, the terminal generates the scrambling code sequence or the reference signal sequence by using the assistance information, to support randomization of channel or signal interference between different users, within a user group, or between user groups, and can reduce a false alarm probability in channel or signal reception.

Further, the assistance information further includes at least part of at least one of the following information, or a value obtained by mapping the at least part, or a range of at least one of the following information:
- service information;
- a resource allocation mode;
- resource pool information;
- bandwidth part information;
- carrier information; or
- geographic location information.

An embodiment of this disclosure provides a terminal, including a memory, a processor, and a computer program that is stored in the memory and capable of running on the processor, where when the computer program is executed by the processor, the steps of the foregoing sequence generation method or the steps of the foregoing signal receiving method are implemented.

Figure 5:
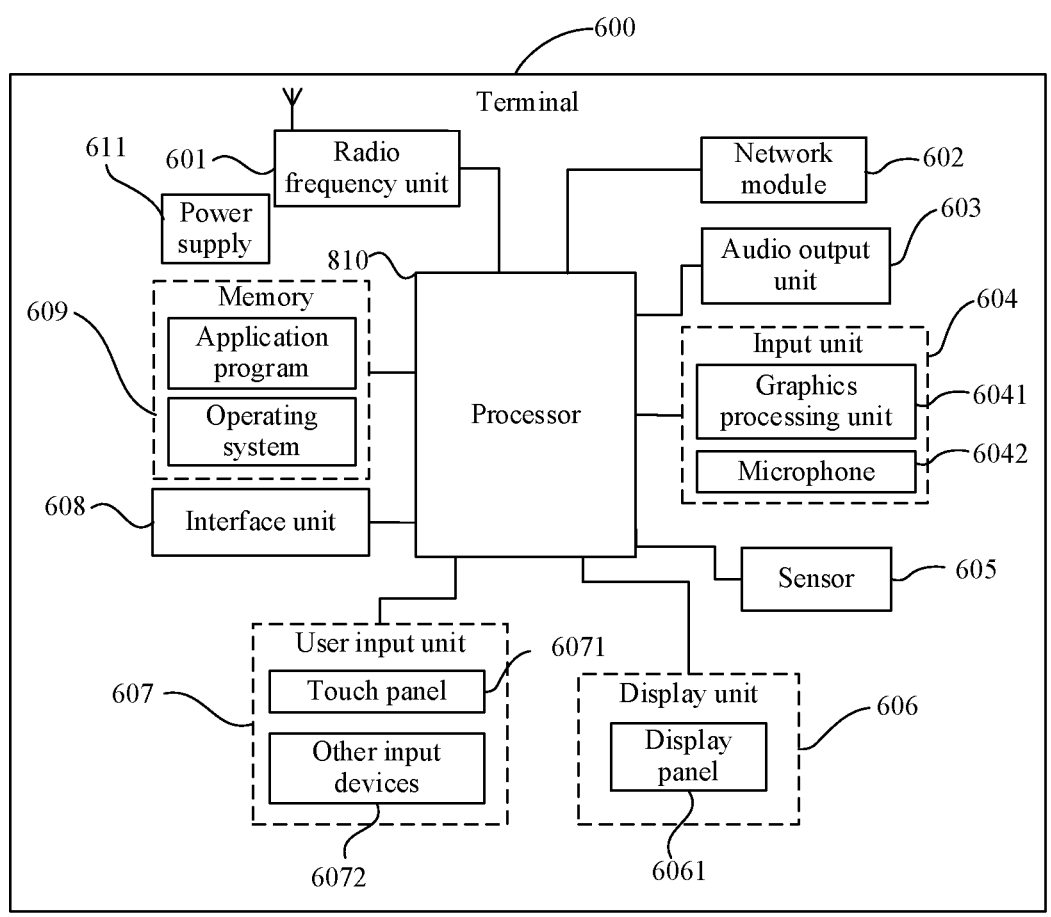
FIG. 5 is a schematic diagram of composition of a terminal according to an embodiment of this disclosure.

As shown in FIG. 5, the terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the terminal structure shown in FIG. 5 does not constitute a limitation on the terminal. The terminal may include more or fewer components than those shown in the figure, or combine some of the components, or have different arrangements of components. In this embodiment of this disclosure, the terminal includes but is not limited to a mobile phone, a tablet computer, a laptop computer, a personal digital assistant, an in-vehicle terminal, a wearable device, a pedometer, and the like.

The processor 610 is configured to generate a scrambling code sequence or a reference signal sequence by using assistance information, where the assistance information includes at least part of at least one of the following information, or a value obtained by mapping the at least part, or a range of at least one of the following information:
- identifier information;
- timing information;
- payload information of a signal corresponding to the sequence;
- payload information of a signal associated with the sequence;
- a scheduling mode; or
- a transmission mode.

Further, the assistance information further includes at least part of at least one of the following information, or a value obtained by mapping the at least part, or a range of at least one of the following information:
  service information;
  a resource allocation mode;
  resource pool information;
  bandwidth part information;
  carrier information; or
  geographic location information.

Further, the assistance information is obtained in the following manner:
  obtaining the assistance information that is configured by a network side; or
  obtaining the assistance information that is preconfigured; or
  obtaining the assistance information that is configured by other terminals; or
  generating the assistance information.

Further, the timing information includes at least one of the following:
  a frame number on a sidelink, a subframe number on a sidelink, a slot number on a sidelink, a millisecond number on a sidelink, or an OFDM symbol number on a sidelink.

Further, the processor 610 is configured to determine at least one of the following based on the assistance information:
  an initialization state of the scrambling code sequence, a generation formula for the scrambling code sequence, a candidate sequence for the scrambling code sequence, a sequence part for scrambling, or a cyclic shift of the scrambling code sequence.

Further, the identifier information includes at least one of the following:
  a terminal identifier;
  an identifier of a group to which the terminal belongs;
  an identifier of a header user in a group to which the terminal belongs;
  an identifier of a user type;
  an identifier of a synchronization source for a user;
  an identifier of a signal sequence;
  an identifier of a signal to which the scrambling code belongs; or
  a scrambling code identifier.

Further, the identifier includes at least one of the following:
  a physical layer identifier, a media access control identifier, a radio link control identifier, a packet data convergence protocol identifier, a service data adaptation protocol identifier, a radio resource control identifier, or an application layer identifier.

Further, in a case that the signal to which the scrambling code belongs is a signal on a PSBCH, the identifier of the signal to which the scrambling code belongs is an identifier of the PSBCH, and includes at least one of the following:
  an S-SSB index of a S-SSB where the PSBCH is located;
  a synchronization signal sequence identifier in an S-SSB; or
  an identifier carried in a PSBCH in an S-SSB.

Alternatively, in a case that the signal to which the scrambling code belongs is SCI, the identifier of the signal to which the scrambling code belongs is an identifier of the SCI, and includes at least one of the following:
  a RNTI corresponding to the SCI;
  a format of the SCI;
  a type of the SCI;
  an identifier of a search space corresponding to the SCI;
  an identifier of a process corresponding to the SCI; or
  a beam information identifier of a PSCCH to which the SCI belongs.

Alternatively, in a case that the signal to which the scrambling code belongs is SFCI, the identifier of the signal to which the scrambling code belongs is an identifier of the SFCI, and includes at least one of the following:
  an RNTI corresponding to the SFCI;
  a format of the SFCI;
  a type of the SFCI;
  an identifier of a search space corresponding to the SFCI;
  an identifier of a process corresponding to the SFCI; or
  a beam information identifier of a physical sidelink feedback channel PSFCH to which the SFCI belongs.

Alternatively, in a case that the signal to which the scrambling code belongs is SFCI, the identifier of the signal to which the scrambling code belongs is an identifier of data corresponding to the SFCI, and includes at least one of the following:
  an identifier carried in the data;
  an identifier of a process corresponding to the data;
  CRC of the data; or
  a beam information identifier of the data.

Alternatively, in a case that the signal to which the scrambling code belongs is sidelink data, the identifier of the signal to which the scrambling code belongs is an identifier of SCI that schedules the sidelink data, and includes at least one of the following:
  an RNTI corresponding to the SCI;
  a format of the SCI;
  a type of the SCI;
  an identifier of a search space corresponding to the SCI;
  an identifier of a process corresponding to the SCI;
  CRC of the SCI; or
  a beam information identifier of a PSCCH to which the SCI belongs.

Further, information in the assistance information used for determining the initialization state at least partially coincides with information carried in a reference signal corresponding to the scrambling code sequence.

Further, the processor 610 is configured to perform at least one of the following:
  determining, based on a value of the at least one item of the assistance information, an initialization state corresponding to the value, where the initialization state is a formula or a binary number;
  determining, based on a value of the at least one item of the assistance information, a sequence generation formula corresponding to the value;
  determining, based on a value of the at least one item of the assistance information, a candidate sequence corresponding to the value;
  determining, based on a value of the at least one item of the assistance information, a part for scrambling, in the sequence, corresponding to the value; or determining, based on a value of the at least one item of the assistance information, a cyclic shift, of the sequence, corresponding to the value.

Further, the processor 610 is configured to determine the initialization state according to the following formula when N parameters in the assistance information are used to determine the initialization state:

$$c_{init} = \left(\sum_{i=1}^{N} n_i \cdot 2^{coe_i}\right) \mod 2^M \text{ or } c_{init} = \sum_{i=1}^{N} n_i \cdot 2^{coe_i},$$

where n$_i$ is the i$^{th}$ parameter in the assistance information used to determine the initialization state, $2^{coe_j}$ is a coefficient of the parameter and is an integer power of 2, and M indicates that the scrambling code sequence is generated based on a sequence of a length M.

Further, when the initialization state is determined based on the identifier information in the assistance information, the formula is satisfied if P parameters in the identifier information are used to determine the initialization state:

$$c_{init} = \left(\sum_{j=1}^{P} p_j \cdot 2^{coe_j}\right) \mod 2^Q \text{ or } c_{init} = \sum_{j=1}^{P} p_j \cdot 2^{coe_j},$$

where p$_j$ is the j$^{th}$ parameter in the assistance identifier information used to determine the initialization state, $2^{coe_j}$ is a coefficient of the parameter and is an integer power of 2, and Q indicates that the scrambling code sequence is generated based on a sequence of a length Q.

Further, in a case that the scrambling code sequence is used to scramble a PSBCH, the processor 610 is configured to determine the initialization state of the scrambling code sequence based on at least one of the identifier information or payload information of a signal to which the scrambling code sequence belongs.

Further, the processor 610 is configured to perform at least one of the following:
  determining the initialization state of the sequence generated, based on the identifier information;
  determining the initialization state of the sequence generated, based on the payload information of the signal to which the scrambling code belongs; or
  determining the initialization state of the sequence generated, based on the payload information of the signal to which the scrambling code belongs and a synchronization signal sequence identifier in the identifier information.

Further, in a case that the scrambling code sequence is used to scramble a PSBCH, the processor 610 is configured to determine the sequence part for scrambling based on at least one of the identifier information, the timing information, or payload information of a PSBCH to which the sequence belongs.

Further, in a case that the scrambling code sequence is used to scramble SCI and/or SFCI and/or a PSSCH, the processor 610 is configured to determine the initialization state of the scrambling code sequence based on the identifier information.

Further, the processor 610 is configured to perform at least one of the following:
  determining the initialization state of the sequence generated, based on a terminal identifier;
  determining the initialization state of the sequence generated, based on a scrambling code identifier;
  determining the initialization state of the sequence generated, based on a terminal identifier and a scrambling code identifier; or
  determining the initialization state of the sequence generated, based on a terminal identifier, an identifier of a signal to which the scrambling code belongs, and a scrambling code identifier.

Further, in a case that the scrambling code sequence is used to scramble SCI and/or SFCI and/or a PSSCH, the processor 610 is configured to determine the sequence part for scrambling based on at least one of the transmission mode, the service information, the resource allocation mode, the scheduling mode, the resource pool information, the bandwidth part information, the carrier information, or the geographic location information.

Further, the processor 610 is configured to perform at least one of the following:
  determining an initialization state of the reference signal sequence based on the assistance information, and generating the reference signal sequence based on the initialization state; or
  determining a low-PAPR sequence based on the assistance information, and generating the reference signal sequence based on the low-PAPR sequence.

Further, the identifier information includes at least one of the following:
  a terminal identifier;
  an identifier of a group to which the terminal belongs;
  an identifier of a header user in a group to which the terminal belongs;
  an identifier of a user type;
  an identifier of a synchronization source for a user; or
  an identifier of a signal sequence.

Further, the identifier includes at least one of the following:
  a physical layer identifier, a media access control identifier, a radio link control identifier, a packet data convergence protocol identifier, a service data adaptation protocol identifier, a radio resource control identifier, or an application layer identifier.

Further, a signal associated with the reference signal sequence includes:
  a control signal demodulated using the reference signal sequence; or
  a feedback signal demodulated using the reference signal sequence; or
  a data signal demodulated using the reference signal sequence; or
  a data signal scheduled by a control signal demodulated using the reference signal sequence; or
  a data signal corresponding to a feedback signal demodulated using the reference signal sequence; or
  a signal indicating the reference signal sequence.

Further, the processor 610 is configured to perform at least one of the following:
  generating the initialization state based on payload information carried in a signal associated with the reference signal sequence; or
  generating the initialization state based on the identifier information.

Further, when the low-PAPR sequence is determined based on the assistance information, the processor 610 is configured to perform at least one of the following:
  determining a reference signal sequence identifier and/or a group sequence identifier and/or a sequence identifier (sequence number) and/or a hop identifier and/or a cyclic shift based on payload information carried in a signal associated with the reference signal sequence; or
  determining a reference signal sequence identifier and/or a group sequence identifier and/or a sequence identifier (sequence number) and/or a hop identifier and/or a cyclic shift based on a UE identifier.

Further, the processor 610 is further configured to receive a signal, where a scrambling code sequence or a reference signal sequence for the signal is generated by using assistance information, and the assistance information includes at least part of at least one of the following information, or a value obtained by mapping the at least part, or a range of at least one of the following information:
- identifier information;
- timing information;
- payload information of a signal corresponding to the sequence;
- payload information of a signal associated with the sequence;
- a scheduling mode; or
- a transmission mode.

In this embodiment, the terminal generates the scrambling code sequence or the reference signal sequence by using the assistance information, to support randomization of channel or signal interference between different users, within a user group, or between user groups, and can reduce a false alarm probability in channel or signal reception.

Further, the assistance information further includes at least part of at least one of the following information, or a value obtained by mapping the at least part, or a range of at least one of the following information:
- service information;
- a resource allocation mode;
- resource pool information;
- bandwidth part information;
- carrier information; or
- geographic location information.

It should be understood that in this embodiment of this disclosure, the radio frequency unit 601 may be configured to: receive and send signals in an information receiving/sending process or a call process; and specifically, send the downlink data received from a base station to the processor 610 for processing, and send uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may further communicate with a network and other devices through a wireless communications system.

The terminal provides wireless broadband internet access for a user by using the network module 602, for example, helping the user send and receive e-mails, browse web pages, and access streaming media.

The audio output unit 603 may convert audio data into an audio signal, and output the audio signal as sound, where the audio data is received by the radio frequency unit 601 or the network module 602, or stored in the memory 609. In addition, the audio output unit 603 may further provide audio output (for example, a call signal reception tone or a message reception tone) that is related to a particular function performed by the terminal 600. The audio output unit 603 includes a loudspeaker, a buzzer, a phone receiver, and the like.

The input unit 604 is configured to receive an audio signal or a video signal. The input unit 604 may include a Graphics Processing Unit (GPU) 6041 and a microphone 6042, and the graphics processing unit 6041 processes image data of a static picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium), or may be sent by the radio frequency unit 601 or the network module 602. The microphone 6042 may receive a sound, and can process the sound into audio data. In a phone call mode, processed audio data may be converted, for output, into a format for transmission by the radio frequency unit 601 to a mobile communications base station.

The terminal 600 further includes at least one sensor 605, for example, an optical sensor, a motion sensor, and another sensor. Specifically, the optical sensor includes an ambient light sensor and a proximity sensor. The ambient light sensor may adjust brightness of a display panel 6061 based on intensity of ambient light. When the terminal 600 moves near an ear, the proximity sensor may disable the display panel 6061 and/or backlight. As a motion sensor, an accelerometer sensor may detect magnitudes of accelerations in various directions (there are usually three axes), may detect the magnitude and direction of gravity when the terminal is still, and may be configured for terminal posture recognition (for example, landscape/portrait mode switching, related gaming, or magnetometer posture calibration), functions related to vibration recognition (for example, pedometer or tapping), or the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information input by the user or information provided for the user. The display unit 606 may include the display panel 6061. Optionally, the display panel 6061 may be configured in a form of a Liquid Crystal Display (LCD), an Organic Light-Emitting Diode (OLED), or the like.

The user input unit 607 may be configured to receive input digit or character information, and generate key signal input that is related to user setting and function control of the terminal. Specifically, the user input unit 607 includes a touch panel 6071 and other input devices 6072. The touch panel 6071 is also referred to as a touchscreen, and may collect a touch operation of the user on or near the touch panel (for example, an operation performed on or near the touch panel 6071 by the user by using any appropriate object or accessory such as a finger or a stylus). The touch panel 6071 may include two parts: a touch detection apparatus and a touch controller. The touch detection apparatus detects a touch orientation of the user, and detects a signal brought by the touch operation, and transmits the signal to the touch controller. The touch controller receives touch information from the touch detection apparatus, converts the touch information into touch point coordinates, sends the touch point coordinates to the processor 610, receives and executes a command sent by the processor 610. In addition, the touch panel 6071 may be implemented in a plurality of types, for example, as a resistive, capacitive, infrared, or surface acoustic wave touch panel. In addition to the touch panel 6071, the user input unit 607 may further include the other input devices 6072. Specifically, the other input devices 6072 may include but are not limited to a physical keyboard, a function key (for example, a volume control key or a power on/off key), a track ball, a mouse, and a joystick. Details are not described herein.

Further, the touch panel 6071 may cover the display panel 6061. After detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. In FIG. 5, the touch panel 6071 and the display panel 6061 serve as two separate components to implement input and output functions of the terminal. However, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 608 may be configured to receive input (for example, data information and electric power) from the external apparatus, and transmit the received input to one or more elements in the terminal 600; or may be configured to transmit data between the terminal 600 and the external apparatus.

The memory 609 may be configured to store software programs and various types of data. The memory 609 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 609 may include a high-speed random access memory, and may further include a nonvolatile memory, for example, at least one magnetic disk storage device or a flash memory device, or other volatile solid-state storage devices.

The processor 610 is a control center of the terminal. It connects various parts of the entire terminal by using various interfaces and lines, and executes various functions and data processing of the terminal by running or executing software programs and/or modules stored in the memory 609 and invoking data stored in the memory 609, so as to perform overall monitoring on the terminal. The processor 610 may include one or more processing units. For example, the processor 610 may integrate an application processor and a modem processor. The application processor mainly processes the operating system, a user interface, an application program, and the like. The modem processor mainly processes wireless communication. It can be understood that the modem processor may be alternatively not integrated in the processor 610.

The terminal 600 may further include the power supply 611 (such as a battery) supplying power to the components. For example, the power supply 611 may be logically connected to the processor 610 by using a power management system, so that functions such as charge and discharge management and power consumption management are implemented by using the power management system.

In addition, the terminal 600 includes some functional modules that are not shown. Details are not described herein.

An embodiment of this disclosure provides a computer-readable storage medium, where the computer-readable storage medium stores a computer program, and when the computer program is executed by a processor, the steps of the foregoing sequence generation method or the steps of the foregoing signal receiving method are implemented.

It can be understood that the embodiments described in this specification may be implemented by hardware, software, firmware, middleware, microcode, or a combination thereof. For hardware implementation, the processing unit may be implemented in one or more Application Specific Integrated Circuits (ASIC), a digital signal processor (e.g., Digital Signal Processing, hereafter referred to as "DSP"), a DSP Device (DSPD), a Programmable Logic Device (PLD), a Field-Programmable Gate Array (FPGA), a general-purpose processor, a controller, a microcontroller, a microprocessor, another electronic unit for performing the functions described in this application, or a combination thereof.

For software implementation, the technology described herein may be implemented by executing modules (for example, procedures and functions) of the functions described herein. Software code may be stored in the memory and executed by the processor. The memory may be implemented in or outside the processor.

All embodiments in this specification are described in a progressive manner. Each embodiment focuses on differences from other embodiments. For the part that is the same or similar between different embodiments, reference may be made between the embodiments.

Persons skilled in the art should understand that the embodiments of this disclosure may be provided as a method, an apparatus, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the user equipment (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

These computer program instructions may also be stored in a computer-readable memory that can direct the computer or any other programmable data processing user equipment to work in a specific manner, so that the instructions stored in the computer-readable memory produce an artifact that includes an instruction apparatus. The instruction apparatus implements a specific function in one or more processes in the flowcharts and/or in one or more blocks in the block diagrams.

These computer program instructions may be loaded onto a computer or other programmable data processing user equipment, so that a series of operations and steps are performed on the computer or the other programmable user equipment, thereby generating computer-implemented processing. Therefore, the instructions executed on the computer or the other programmable user equipment provide steps for implementing the functions specified in one or more processes in the flowcharts and/or in one or more blocks in the block diagrams.

Although some example embodiments of the embodiments of this disclosure have been described, persons skilled in the art can make changes and modifications to these embodiments once they learn the basic inventive concept. Therefore, the following claims are intended to be construed as to cover the example embodiments and all changes and modifications falling within the scope of the embodiments of this disclosure.

It should be further noted that in this specification, relational terms such as "first" and "second" are only used to distinguish one entity or operation from another, and do not necessarily require or imply that any actual relationship or sequence exists between these entities or operations. Moreover, the terms "include" and "comprise", or any of their variants are intended to cover a non-exclusive inclusion, such that a process, a method, an article, or user equipment that includes a list of elements not only includes those elements but also includes other elements that are not expressly listed, or further includes elements inherent to such a process, method, article, or user equipment. In absence of more constraints, an element preceded by "includes a . . . " does not preclude the existence of other identical elements in the process, method, article, or user equipment that includes the element.

The foregoing descriptions are example implementations of this disclosure. It should be noted that a person of ordinary skill in the art may make several improvements or refinements without departing from the principle of this disclosure and the improvements or refinements shall fall within the protection scope of this disclosure.

What is claimed is:

1. A sequence generation method, performed by a terminal, comprising:
   generating a scrambling code sequence or a reference signal sequence by using assistance information, wherein the assistance information comprises at least part of at least one of the following information, or a value obtained by mapping to the at least part of the at least one of the following information, or a range of the at least one of the following information, wherein the at least one of the following information comprises:
   identifier information, wherein the identifier information comprises an identifier of a signal sequence, wherein the identifier of the signal sequence comprises: a joint identifier of a primary synchronization sequence and a secondary synchronization sequence in the signal sequence.

2. The sequence generation method according to claim 1, wherein the at least one of the following information further comprises:
   timing information comprising:
   a frame number on a sidelink, a subframe number on a sidelink, a slot number on a sidelink, a millisecond number on a sidelink, or an orthogonal frequency division multiplexing (OFDM) symbol number on a sidelink;
   payload information of a signal corresponding to the sequence;
   payload information of a signal associated with the sequence;
   a scheduling mode;
   a transmission mode;
   service information;
   a resource allocation mode;
   resource pool information;
   bandwidth part information;
   carrier information; or
   geographic location information.

3. The sequence generation method according to claim 1, wherein the generating a scrambling code sequence by using assistance information comprises:
   determining at least one of the following based on at least one item of the assistance information:
   an initialization state of the scrambling code sequence, a generation formula for the scrambling code sequence, a candidate sequence for the scrambling code sequence, a sequence part for scrambling, or a cyclic shift of the scrambling code sequence.

4. The sequence generation method according to claim 3, wherein the identifier information further comprises at least one of the following:
   a terminal identifier;
   an identifier of a group to which the terminal belongs;
   an identifier of a header user in a group to which the terminal belongs;
   an identifier of a user type;
   an identifier of a synchronization source for a user;
   an identifier of a signal to which the scrambling code belongs; or
   a scrambling code identifier.

5. The sequence generation method according to claim 3, further comprising at least one of the following:
   determining, based on a value of the at least one item of the assistance information, an initialization state corresponding to the value, wherein the initialization state is a formula or a binary number;
   determining, based on a value of the at least one item of the assistance information, a sequence generation formula corresponding to the value;
   determining, based on a value of the at least one item of the assistance information, a candidate sequence corresponding to the value;
   determining, based on a value of the at least one item of the assistance information, a sequence part for scrambling, in the sequence, corresponding to the value; or
   determining, based on a value of the at least one item of the assistance information, a cyclic shift, of the sequence, corresponding to the value.

6. The sequence generation method according to claim 3, wherein the determining, based on a value of the at least one item of the assistance information, an initialization state corresponding to the value comprises:
   when N parameters in the assistance information are used to determine the initialization state, determining the initialization state according to the following formula:

$$c_{init} = \left(\sum_{i=1}^{N} n_i \cdot 2^{coe_i}\right) \mod 2^M \text{ or } c_{init} = \sum_{i=1}^{N} n_i \cdot 2^{coe_i},$$

wherein
   $n_i$ is the $i^{th}$ parameter in the assistance information used to determine the initialization state, $2^{coe_i}$ is a coefficient of the parameter and is an integer power of 2, and M indicates that the scrambling code sequence is generated based on a sequence of a length M.

7. The sequence generation method according to claim 6, wherein
   when the initialization state is determined based on the identifier information in the assistance information, if P parameters in the identifier information are used to determine the initialization state, the following formula holds:

$$c_{init} = \left(\sum_{j=1}^{P} p_j \cdot 2^{coe_j}\right) \bmod 2^Q \text{ or } c_{init} = \sum_{j=1}^{P} p_j \cdot 2^{coe_j},$$

wherein $p_j$ is the $j^{th}$ parameter in the assistance identifier information used to determine the initialization state, $2^{coe_j}$ is a coefficient of the parameter and is an integer power of 2, and Q indicates that the scrambling code sequence is generated based on a sequence of a length Q.

8. The sequence generation method according to claim 3, wherein when the scrambling code sequence is used to scramble a physical sidelink broadcast channel (PSBCH), the determining an initialization state of the scrambling code sequence based on the assistance information comprises:
   determining the initialization state of the scrambling code sequence based on at least one of the identifier information or payload information of a signal to which the scrambling code sequence belongs.

9. The sequence generation method according to claim 3, wherein when the scrambling code sequence is used to scramble a PSBCH, the determining a sequence part for scrambling based on the assistance information comprises:
   determining the sequence part for scrambling based on at least one of the identifier information, the timing information, or payload information of a PSBCH to which the sequence belongs.

10. The sequence generation method according to claim 3, wherein when the scrambling code sequence is used to scramble sidelink control information (SCD or sidelink feedback control information (SFCD) or a Physical sidelink Shared Channel (PSSCH), the determining an initialization state of the scrambling code sequence based on the assistance information comprises:
   determining the initialization state of the scrambling code sequence based on the identifier information,
   wherein the determining the initialization state of the scrambling code sequence based on the identifier information comprises at least one of the following:
   determining the initialization state of the sequence generated, based on a terminal identifier;
   determining the initialization state of the sequence generated, based on a scrambling code identifier:
   determining the initialization state of the sequence generated, based on a terminal identifier and a scrambling code identifier; or
   determining the initialization state of the sequence generated, based on a terminal identifier, an identifier of a signal to which the scrambling code belongs, and a scrambling code identifier.

11. The sequence generation method according to claim 3, wherein when the scrambling code sequence is used to scramble SCI or SFCI or a PSSCH, the determining a sequence part for scrambling based on the assistance information comprises:
   determining the sequence part for scrambling based on at least one of the transmission mode, the service information, the resource allocation mode, the scheduling mode, the resource pool information, the bandwidth part information, the carrier information, or the geographic location information.

12. The sequence generation method according to claim 1, wherein generating the reference signal sequence by using assistance information comprises at least one of the following:
   determining an initialization state of the reference signal sequence based on the assistance information, and generating the reference signal sequence based on the initialization state; or
   determining a low Peak-to-Average Power Ratio (low-PAPR) sequence based on the assistance information, and generating the reference signal sequence based on the low-PAPR sequence.

13. The sequence generation method according to claim 12, wherein the identifier information comprises at least one of the following:
   a terminal identifier;
   an identifier of a group to which the terminal belongs;
   an identifier of a synchronization source for a user;
   an identifier of a header user in a group to which the terminal belongs; or
   an identifier of a user type.

14. The sequence generation method according to claim 12, wherein a signal associated with the reference signal sequence comprises:
   a control signal demodulated using the reference signal sequence; or
   a feedback signal demodulated using the reference signal sequence; or
   a data signal demodulated using the reference signal sequence; or
   a data signal scheduled by a control signal demodulated using the reference signal sequence; or
   a data signal corresponding to a feedback signal demodulated using the reference signal sequence; or
   a signal indicating the reference signal sequence.

15. The sequence generation method according to claim 14, wherein determining the initialization state of the reference signal sequence based on the assistance information comprises at least one of the following:
   generating the initialization state based on payload information carried in the signal associated with the reference signal sequence; or
   generating the initialization state based on the identifier information.

16. The sequence generation method according to claim 12, wherein the determining a low-PAPR sequence based on the assistance information, and generating the reference signal sequence based on the low-PAPR sequence comprises at least one of the following:
   determining a reference signal sequence identifier or a group sequence identifier or a sequence identifier or a hop identifier or a cyclic shift based on payload information carried in a signal associated with the reference signal sequence; or
   determining a reference signal sequence identifier or a group sequence identifier or a sequence identifier or a hop identifier or a cyclic shift based on the identifier information.

17. A terminal, comprising: a memory; a processor; and a computer program that is stored in the memory and capable of running on the processor, wherein the computer program, when executed by the processor, causes the processor to:
   generate a scrambling code sequence or a reference signal sequence by using assistance information, wherein the assistance information comprises at least part of at least one of the following information, or a value obtained by mapping to the at least part of the at least one of the following information, or a range of the at least one of the following information, wherein the at least one of the following information comprises:

identifier information, wherein the identifier information comprises an identifier of a signal sequence, wherein the identifier of the signal sequence comprises: a joint identifier of a primary synchronization sequence and a secondary synchronization sequence in the signal sequence.

18. The terminal according to claim 17, wherein to generate the scrambling code sequence by using assistance information, the processor is further configured to:

determine at least one of the following based on at least one item of the assistance information:

an initialization state of the scrambling code sequence, a generation formula for the scrambling code sequence, a candidate sequence for the scrambling code sequence, a sequence part for scrambling, or a cyclic shift of the scrambling code sequence.

19. The terminal according to claim 17, wherein to generate the reference signal sequence by using assistance information, the processor is further configured to:

determine an initialization state of the reference signal sequence based on the assistance information, and generate the reference signal sequence based on the initialization state; or determine a low Peak-to-Average Power Ratio (low-PAPR) sequence based on the assistance information, and generate the reference signal sequence based on the low-PAPR sequence.

20. A non-transitory computer-readable storage medium, wherein the computer-readable storage medium stores a computer program, and when the computer program is executed by a processor, causes the processor to:

generate a scrambling code sequence or a reference signal sequence by using assistance information, wherein the assistance information comprises at least part of at least one of the following information, or a value obtained by mapping to the at least part of the at least one of the following information, or a range of the at least one of the following information, wherein the at least one of the following information comprises:

identifier information, wherein the identifier information comprises an identifier of a signal sequence, wherein the identifier of the signal sequence comprises: a joint identifier of a primary synchronization sequence and a secondary synchronization sequence in the signal sequence.

* * * * *